United States Patent [19]

Zimmermann et al.

[11] Patent Number: 5,183,565
[45] Date of Patent: Feb. 2, 1993

[54] APPARATUS AND PROCESS FOR TREATING WATER

[76] Inventors: Heinz Zimmermann, Am Párk 22, D-4156 Willich; Hans J. M. Manteuffel, Am alten Broich 213a, D-4018 Langenfeld, both of Fed. Rep. of Germany

[21] Appl. No.: 717,017

[22] Filed: Jun. 18, 1991

[30] Foreign Application Priority Data

Jun. 20, 1990 [DE] Fed. Rep. of Germany ....... 4019580

[51] Int. Cl.$^5$ .......................................... B01D 24/46
[52] U.S. Cl. .................................. 210/269; 210/670; 204/149; 204/151
[58] Field of Search .............. 204/149, 151; 210/695, 210/748, 663, 665, 668, 669, 687, 670, 662, 266, 269, 243

[56] References Cited

U.S. PATENT DOCUMENTS

| | | | |
|---|---|---|---|
| 2,793,183 | 5/1957 | Thurman | 210/669 |
| 2,794,777 | 6/1957 | Pearson | 204/151 |
| 3,074,863 | 1/1963 | Jasionowski | 204/151 |
| 3,764,499 | 10/1973 | Okubo et al. | 204/151 |
| 3,847,765 | 11/1974 | Uno et al. | 204/151 |
| 4,013,554 | 3/1977 | Reis et al. | 210/670 |
| 4,159,235 | 6/1979 | Kammel et al. | 204/149 |
| 4,326,935 | 4/1982 | Moeglich | 204/151 |
| 4,403,039 | 9/1983 | Ban et al. | 210/662 |
| 4,426,261 | 1/1984 | Fushihara | 204/151 |
| 4,596,641 | 6/1986 | Bridger et al. | 204/282 |
| 4,668,361 | 5/1987 | Klinkowski | 204/151 |
| 4,670,118 | 6/1987 | Klinkowski | 210/748 |
| 4,713,156 | 12/1987 | Gal et al. | 204/151 |
| 4,758,319 | 7/1988 | Klinkowski | 210/748 |
| 4,786,384 | 11/1988 | Gerhardt et al. | 204/149 |
| 4,865,747 | 9/1989 | Larson et al. | 210/748 |
| 4,879,045 | 11/1989 | Eggerichs | 210/748 |
| 4,880,511 | 11/1989 | Sugita | 204/151 |
| 4,929,359 | 5/1990 | Tiernan | 210/663 |
| 5,026,465 | 6/1991 | Katz et al. | 204/151 |

FOREIGN PATENT DOCUMENTS 3341242.1 11/1983 Fed. Rep. of Germany .
3805813.8 2/1988 Fed. Rep. of Germany .

*Primary Examiner*—Stanley S. Silverman
*Assistant Examiner*—Cynthia L. Nessler
*Attorney, Agent, or Firm*—Herbert Dubno

[57] ABSTRACT

The invention relates to an apparatus for removing cations/anions from liquids, having a container material between a cathode and the layer of ion exchange material between the anode and the cathode and a free liquid-filled space as a treatment space between the layer of ion exchange material and the cathode and a liquid-filled outer space between the cathode and the wall of the container, the treatment space and the outer space being connected to one another at both ends in order to permit liquid circulation.

6 Claims, 7 Drawing Sheets

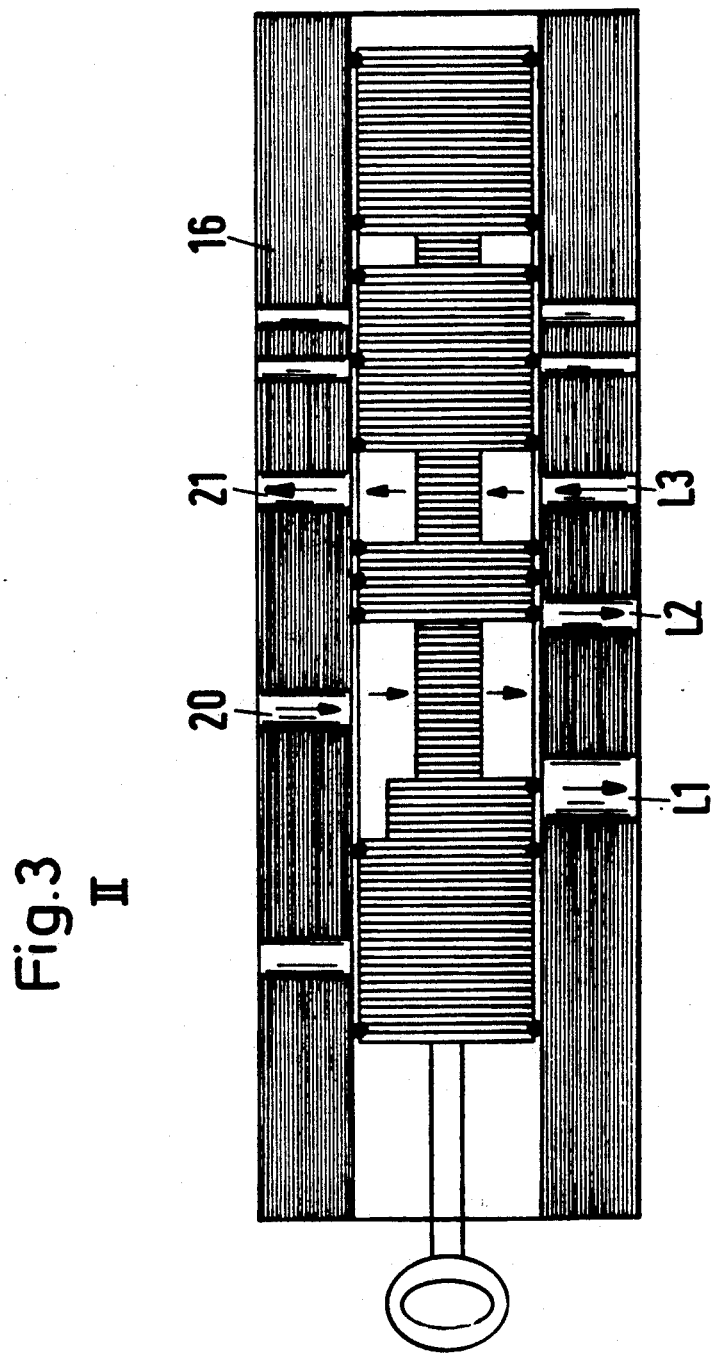

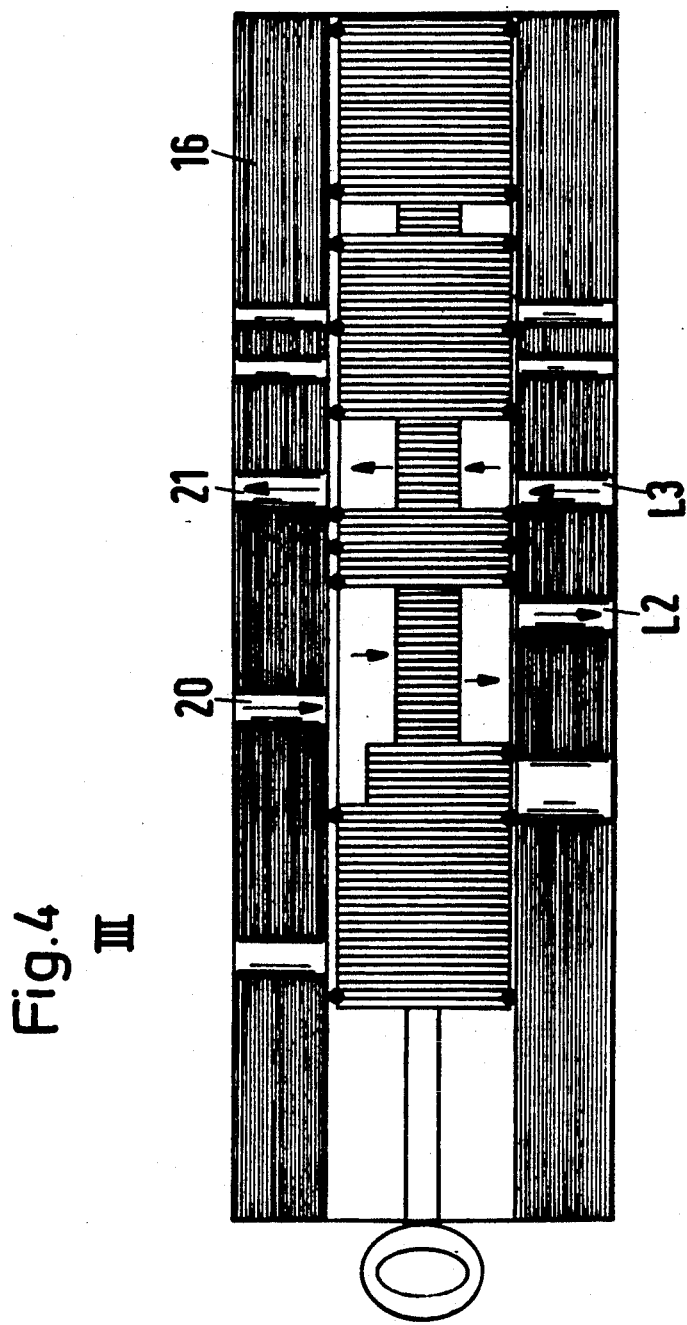

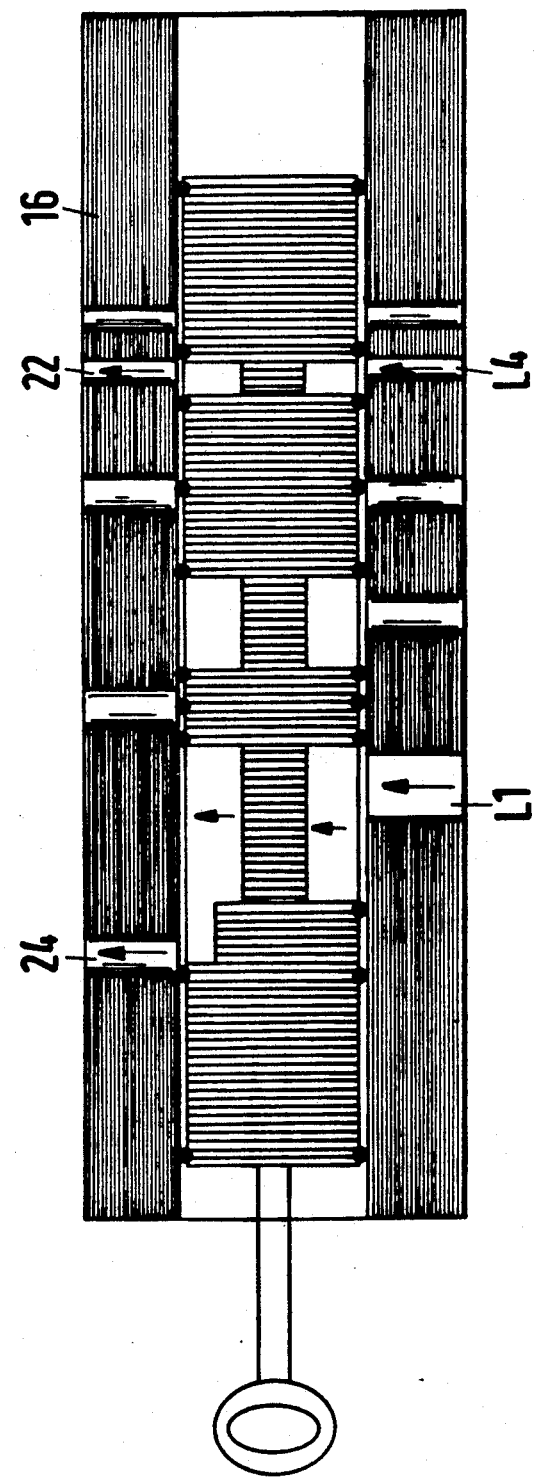

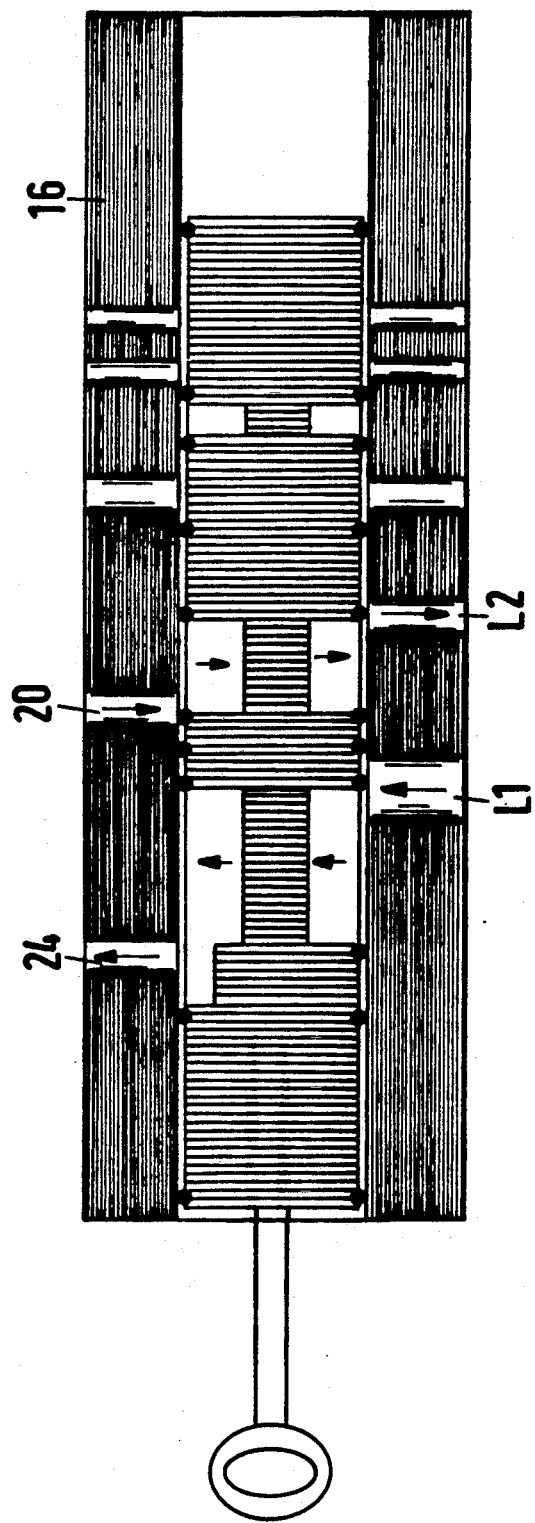

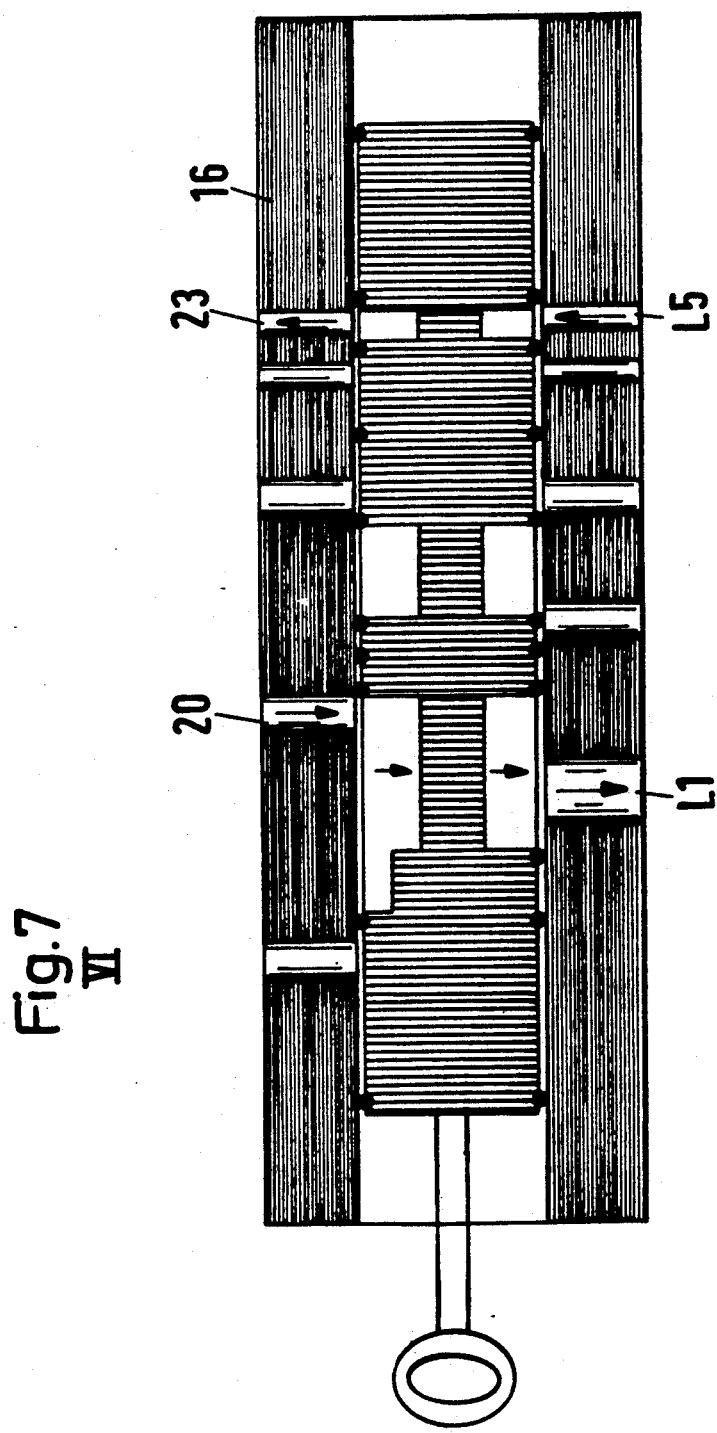

APPARATUS AND PROCESS FOR TREATING WATER

SPECIFICATION

FIELD OF THE INVENTION

The present invention relates to an apparatus for removing cations/anions from liquids, the apparatus having a container containing the liquid in which a layer of ion exchanger material and also a cathode and an anode, to which voltage is applied, are disposed.

BACKGROUND OF THE INVENTION

Processes apparatuses are known in which liquids are subjected to a voltage field, as a result of which the ions, cations or anions contained in the liquid are separated from one another and/or are precipitated in extremely fine dispersion as a solid precipitate. Often the liquid is passed through an ion exchanger in addition to the electrolytic process in order to increase the throughput rate of purified liquid. In that process solid materials are also precipitated. The increase in the purified volume makes possible the continuous performance of the ion exchange process, without the liquid flow having to be interrupted.

An apparatus exploiting this combination of the electrolytic and chemical process principle is described in German Patent Application 3,341,242, in which oxygen is removed from an aqueous solution electrochemically. In this application, the liquid flow is passed through a permeable, spatially extending ion exchanger. At the same time, the liquid flow is subjected to a voltage field which propagates radially from concentrically disposed electrodes and extends coaxially with respect to the liquid flow. The oxygen produced in the ion exchange process is removed via pipes.

German Patent Application 3,805,813, discloses a loaded ion exchange material which can be retreated electrolytically, chemically or electrochemically, without having to be removed from the apparatus. In that case, the ion exchange material is subjected, for example, to a pulsating alternating voltage field or ionizing chemicals.

Common to all these processes and apparatuses is that the precipitating solid material remains in the liquid flow. As a result, it is possible that this material will revert to the original state in a subsequent, even unintended, chemical or electrochemical process and exhibit its harmful or undesirable effect.

Furthermore, it is not possible in the case of the known apparatus to reduce cations and anions with the same ion exchanger material.

OBJECTS OF THE INVENTION

The principle object of the invention is to improve an apparatus known to the prior art.

Another object of the present invention is to provide a process for removing cations/anions from a liquid avoiding drawbacks of the prior art and utilizing the apparatus according to the invention.

SUMMARY OF THE INVENTION

This object is achieved according to the invention by an apparatus wherein there is a layer of ion exchange material between the anode and the cathode and there is a free liquid-filled space as a treatment space between the layer of ion exchange material and the cathode and there is a liquid-filled outer space between the cathode and the wall of the container, the treatment space and the outer space being connected to one another at least at both ends in order to permit liquid circulation.

This apparatus has a simple structure and possesses high efficiency. With a low energy requirement, both cations and anions can be removed using the same ion exchanger material. The ion exchanger material does not become blocked and both inorganic and organic compounds, in particular salts, can be removed from the untreated water.

A diffusion distribution of the pH and of the ions is achieved because of the circulation and, consequently, a homogenization of the concentration is produced. Mixing the liquids taken from the inner space and outer space and/or mixing of the same individually or jointly with untreated water results in a stabilization of the pH of the treated water. The regeneration of the ion exchanger material, in particular of a resin, depends under these conditions on the concentration of the hydrogen ions produced. If the total pressure of the system is increased, the partial pressure of the ions required for the regeneration also increases. This takes place, in particular, as a result of isolating the equipment.

Whereas in the prior art in order to separate cations it is necessary to use a particular ion exchanger material which does not adsorb anions, in the apparatus according to the invention the ion exchanger material can reduce both anions and cations. In contrast to reverse osmosis, in the apparatus according to the invention inorganic and organic compounds contained in the untreated water can be separated with a reduced energy input and at a low pressure.

It is particularly advantageous if the outer space and/or the treatment space open into a settling space at the bottom.

This ensures that the treated water emerging from the apparatus does not contain flocculated material. A high efficiency is also achieved if the elongated anode is centrally axially disposed and the layer of ion exchanger material, the treatment space, the cathode and the outer space are disposed in shell fashion around the anode.

It is particularly advantageous if the anode is disposed in spiral form on the outside of a perforated or slotted inner tube. Furthermore, it is also proposed that the layer of ion exchange material is bounded on one or both sides by a grid, fabric or gauze. The operation of the apparatus is also improved if the treatment space and the outer space are separated by a partition, in particular a tube, on the inside of which the cathode is disposed. At the same time, the wall or the tube may be perforated or slotted.

Preferably the inner tube, the layer of ion exchange material, the partition and/or the container wall, and also the annular intermediate spaces, are coaxial with respect to one another. An optimum flow inside the equipment is achieved if the (longitudinal) axes of the walls, layers and/or tubes are vertical.

In order to achieve simultaneous water removal at the top and bottom of the equipment, so that a mixture of water with different pH values can be removed, a water removal pipe is provided with at least one inlet opening in each case in the lower and upper outer space.

It is of the greatest advantage if the inlet and outlet pipes of the container are connected to a multiway valve. As a result of this, all the functional capabilities of the equipment can be controlled by adjusting only a single valve control element.

Continuous treatment of the untreated water with a high throughput is achieved if the apparatus is a double or multiple system which operates in alternating fashion.

A process for removing cations/anions from liquids comprises the steps of switching the feed and drainage pipes in a manner such that the water treatment time is interrupted by time intervals during which the ion exchange material is regenerated and sludge is removed from the settling space. Such process renders an optimum operating mode. In addition, during the water treatment time, untreated water from time to time flows partly or completely into the outer space and/or into the treatment space. With this operating mode, the effectiveness is lower, so that it is possible to ensure that the treated water cannot be treated excessively and the desired pH is achieved.

BRIEF DESCRIPTION OF THE DRAWING

The above and other objects, features and advantages of our invention will become more readily apparent from the following description, reference being made to the accompanying highly diagrammatic drawing in which:

FIG. 3 is the multiway valve in the mixing position;

FIG. 4 is the multiway valve in the low treatment position;

FIG. 5 is the multiway valve in the regeneration position;

FIG. 6 is the multiway valve in the flushing position; and

FIG. 7 is the multiway valve in the desludging position.

SPECIFIC DESCRIPTION

Figure 1:
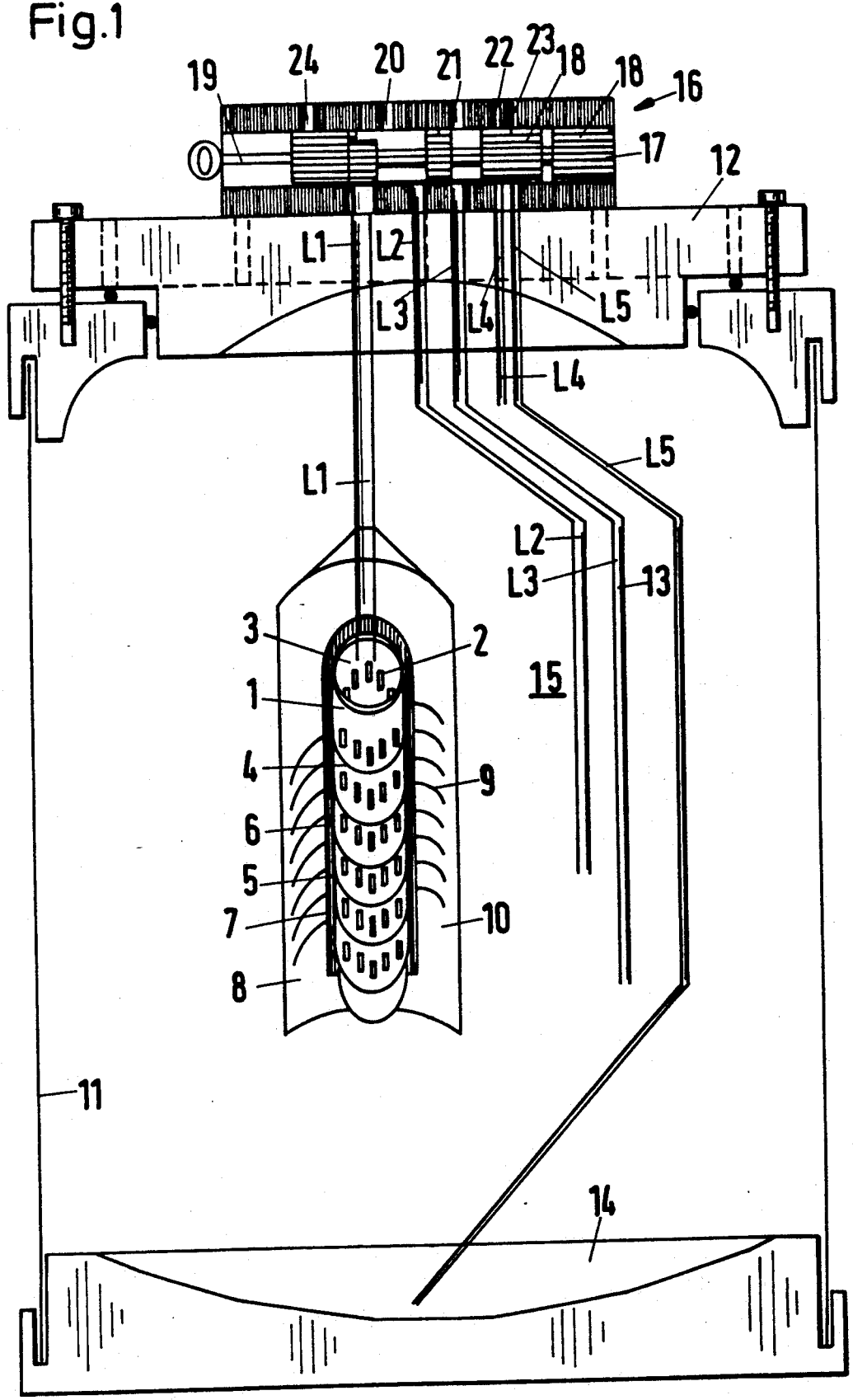
FIG. 1 is a vertical section through the apparatus with a multiway valve mounted at the top and a treatment space disposed internally, the parts of the treatment space being shown isometrically.

The apparatus has a vertical tube 1 formed with openings 2. Forms of the openings can be different but, preferably, have the form of slots. The tube encloses an anode space 3. The tube 1 also forms a support for a helical anode 4 situated on the outside. Around the anode there is a fabric 5, in particular a filter hose, which ensures that the ion exchanger material 6 surrounding the fabric and disposed circumferentially in a layer, does not pass through the openings 2 into the anode space 3. The ion exchanger material is a resin, in particular in the form of spheroids, and is surrounded on the outside by a steel grid 7.

Disposed coaxially at a distance from the grid 7 is a plastic tube 8 against the inside of which a cathode 9 rests in a spiral fashion. Consequently, between the tube 8, and also the cathode 9 and the layer of ion exchanger material there is formed a treatment space 10 which is annular in cross section and which is open at the top and bottom.

The parts 1 to 10 are generally mounted in the center of a cylindrical container 11'. As a result, the tube 8 is mounted substantially equidistant from the wall of the container 11.

During the treatment time, untreated water flows via the pipe L1, which opens in the interior of the anode space 3, into the anode space and leaves calcium behind in the resin of the ion exchanger material 6 in exchange for hydrogen ions.

In the regeneration mode, hydrogen ions migrate from the anode to the cathode and displace the calcium ions in the resin, which migrate to the cathode and are flocculated by the high pH.

From the top of the container 11, a second water inlet pipe L2 projects downwards into the container through the upper container lid 12 next to the water inlet pipe L1, which second water inlet pipe opens roughly in the central region of the container outside the tube 8. Furthermore, a water outlet pipe L3, which opens in the lower region and possesses at least one further inlet opening 13 in the upper region, projects downwards. A venting pipe L4 opens in the upper region and, finally, a desludging pipe L5 opens in the lowermost region, i.e. in the settling space 14. The pipes L2 to L5 consequently extend through the outer space (reservoir) 15 which is situated all around the tube 8.

Figure 2:
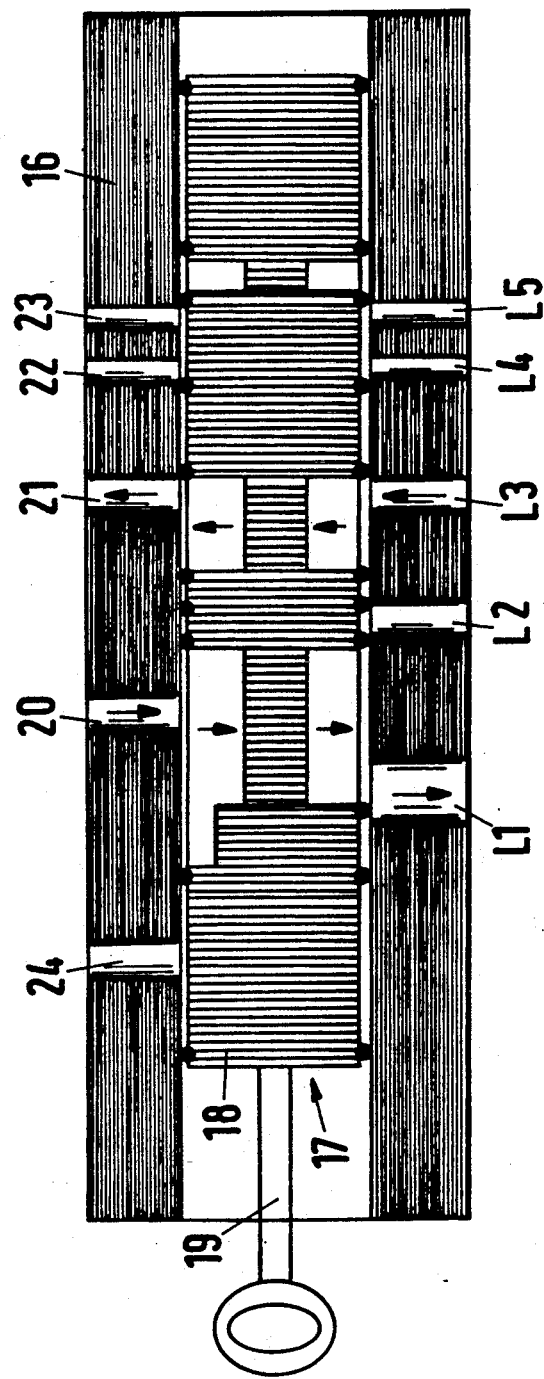
FIG. 2 is a section through the multiway valve in the operating position.

All the pipes L1 to L5 extend through the lid 12 and are connected to a multiway valve 16 which is attached to the top of the lid 12. At the top, the multiway valve 16 is connected to an untreated water inlet 20, a water outlet 21, a venting pipe 22, a desludging pipe 23 and a vent 24 for the anode space. The multiway valve 16 possesses a valve control element 17 having a plurality of separate pistons 18 on a valve rod 19. By setting the valve rod 19 in a plurality of positions, the positions below and, consequently, operating modes of the apparatus can be achieved. The setting of the valve control element 17 and, consequently, of the piston rod 19 is preferably carried out by an electrical setting apparatus which can be regulated/controlled by an electronic apparatus:

I Operating position (FIG. 2)

In the operating position shown in FIG. 2, the pipes L2, L4 and L5 are closed and untreated water is fed through the pipe L1 into the anode space and the treated water is drained via the pipe L3.

II Mixing position (FIG. 3)

In this position, the pipes L4 and L5 are closed and untreated water is admitted both through the pipe L1 and through the pipe L2, with the result that part of the untreated water passes into the anode space and part into the outer space. This produces a lesser treatment effect, ensuring that the water emerging is not excessively treated.

III Lowest treatment position (FIG. 4)

In this position, the pipes L1, L4 and L5 are closed and the untreated water enters only through the pipe L2 and consequently passes only into the outer space 15, with the result that the least possible treatment is achieved. The treated water once again emerges through the pipe L3. In order to equalize the degree of treatment, the apparatus can alternate between positions I to III by means of a control or regulating device.

IV Regeneration (FIG. 5)

The pipes L2, L3 and L5 are closed and a rectified voltage is applied between anode and cathode. As a result of ion migration, the hydrogen ions displace the other cations (e.g. calcium) adsorbed on the ion exchanger material 6 and the concentrations of the cations and hydroxyl ions increase in the outer space 10 and treatment space 15, leading to simultaneous regeneration of the ion exchanger material, desiccation of hydroxides and carbonates in the outer space and treatment space and settling of the same in the settling space 14.

The anions, e.g. chloride, nitrate etc., accumulate in the anode space 3.

During the regeneration time, continuous water extraction is ensured by an apparatus connected in parallel.

V Flushing (FIG. 6)

The pipes L3, L4 and L5 are closed and untreated water enters via the pipe L2 and the water is displaced from the anode space 3 via the pipe L1, as a result of which the undesired anions are flushed out. This state lasts only seconds.

VI Desludging (FIG. 7)

The pipes L2, L3 and L4 are closed, untreated water is forced in through the pipe L1 and sludge is forced out through the pipe L5. This state also lasts only seconds.

We claim:

1. An apparatus for purifying a liquid, said apparatus comprising:
   a container extending along an axis and formed with an inner peripheral wall;
   an elongated anode mounted equidistantly from said inner wall in said container coaxially therewith;
   a cathode mounted in said container and spaced radially outwardly from said anode coaxially therewith, said cathode and said inner wall forming an outer chamber therebetween;
   a cylindrical axially elongated layer of ion exchange material mounted between said anode and cathode in said container, coaxial with said anode and cathode and radially spaced from said anode and cathode, said cathode and said layer forming an inner chamber therebetween;
   means for filling said container with a liquid, said outer chamber being provided with a liquid-fill space and said inner chamber being provided with a treatment free liquid-filled space, each of said outer and inner chambers being axially open at respective opposite ends, so that said spaces are in a flow communication for providing a liquid circulation; and
   means connected with said cathode and anode for generating an electric field.

2. An apparatus for purifying a liquid, said apparatus comprising:
   a container extending along an axis and formed with an inner peripheral wall;
   a tube formed with respective peripheral wall spaced radially inwardly from said inner wall in said container, said wall of said tube being slotted;
   a spiral anode mounted on said wall of said tube;
   a cathode mounted in said container and spaced radially outwardly from said anode, said cathode and said inner wall forming an outer chamber therebetween;
   a layer of ion exchange material mounted between said anode and cathode in said container and radially spaced from said anode and cathode, said cathode and said layer forming an inner chamber therebetween;
   means for filling said container with a liquid, said outer chamber being provided with a liquid-fill space and said inner chamber being provided with a treatment free liquid-filled space, each of said outer and inner chambers being axially open at respective opposite ends so that said spaces are in a flow communication for providing a liquid circulation; and
   means connected with said cathode and anode for generating an electric field.

3. An apparatus for purifying a liquid, said apparatus comprising:
   a container extending along an axis and formed with an inner peripheral wall;
   an anode mounted in said container and spaced radially inwardly from said inner wall;
   means forming a partition mounted in said container and formed with an inner peripheral surface spaced radially outwardly from said anode and an outer peripheral surface;
   a spiral cathode mounted on said inner surface of said partition and spaced radially outwardly from said anode, said outer peripheral surface of said partition and said inner wall of said container forming an outer chamber therebetween;
   a layer of ion exchange material mounted between said anode and cathode in said container and radially spaced from said anode and cathode, said cathode and said layer forming an inner chamber therebetween;
   means for filling said container with a liquid, said outer chamber being provided with a liquid-fill space and said inner chamber being provided with a treatment free liquid-filled space, each of said outer and inner chambers being axially open at respective opposite ends and being separated by said partition, so that said spaces are in a flow communication for providing a liquid circulation; and
   means connected with said cathode and anode for generating an electric field.

4. The apparatus defined in claim 3 wherein said partition is a slotted tube.

5. An apparatus for purifying a liquid, said apparatus comprising:
   a container extending along an axis and formed with an inner peripheral wall;
   an anode mounted in said container and spaced radially inwardly from said inner wall;
   means forming a partition mounted in said container and formed with an inner peripheral surface spaced radially outwardly from said anode and with an outer surface;
   a cathode mounted on said inner surface of said partition and spaced radially outwardly from said anode, said outer peripheral surface of said partition and said inner wall of said container forming an outer chamber therebetween;
   a layer of ion exchange material mounted between said anode and cathode in said container and radially spaced from said anode and cathode, said cathode and said layer forming an inner chamber therebetween said anode, layer cathode and partition being coaxial with said container;
   means for filling said container with a liquid, said outer chamber being provided with a liquid-fill space, said inner chamber being provided with a treatment free liquid-filled space, each of said outer and inner chambers being axially open at respective opposite ends and being separated by said partition, so that said spaces are in a flow communication for providing a liquid circulation; and means connected with said cathode and anode for generating an electric field.

6. An apparatus for purifying a liquid, said apparatus comprising:
- a container extending along an axis and formed with an inner peripheral wall;
- an anode mounted in said container and spaced radially inwardly from said inner wall, said anode being a spiral;
- a helical cathode mounted in said container and spaced radially outwardly from said anode, said cathode and said inner wall forming an outer chamber therebetween;
- a layer of ion exchange material mounted between said anode and cathode in said container and radially spaced from said anode and cathode, said cathode and said layer forming an inner chamber therebetween;
- means for filling said container with a liquid, said outer chamber being provided with a liquid-fill space and said inner chamber being provided with a treatment free liquid-filled space, each of said outer and inner chambers being axially open at respective opposite ends, so that said treatment space and said liquid-fill space being in a flow communication for providing a liquid circulation; and
- means connected with said cathode and anode for generating a magnetic field across said spiral anode and said helical cathode, said field being magnetic direct or alternating field.

* * * * *